No. 675,255. Patented May 28, 1901.
F. W. TANNETT-WALKER.
SLOTTING MACHINE.
(Application filed Jan. 11, 1901.)
(No Model.)
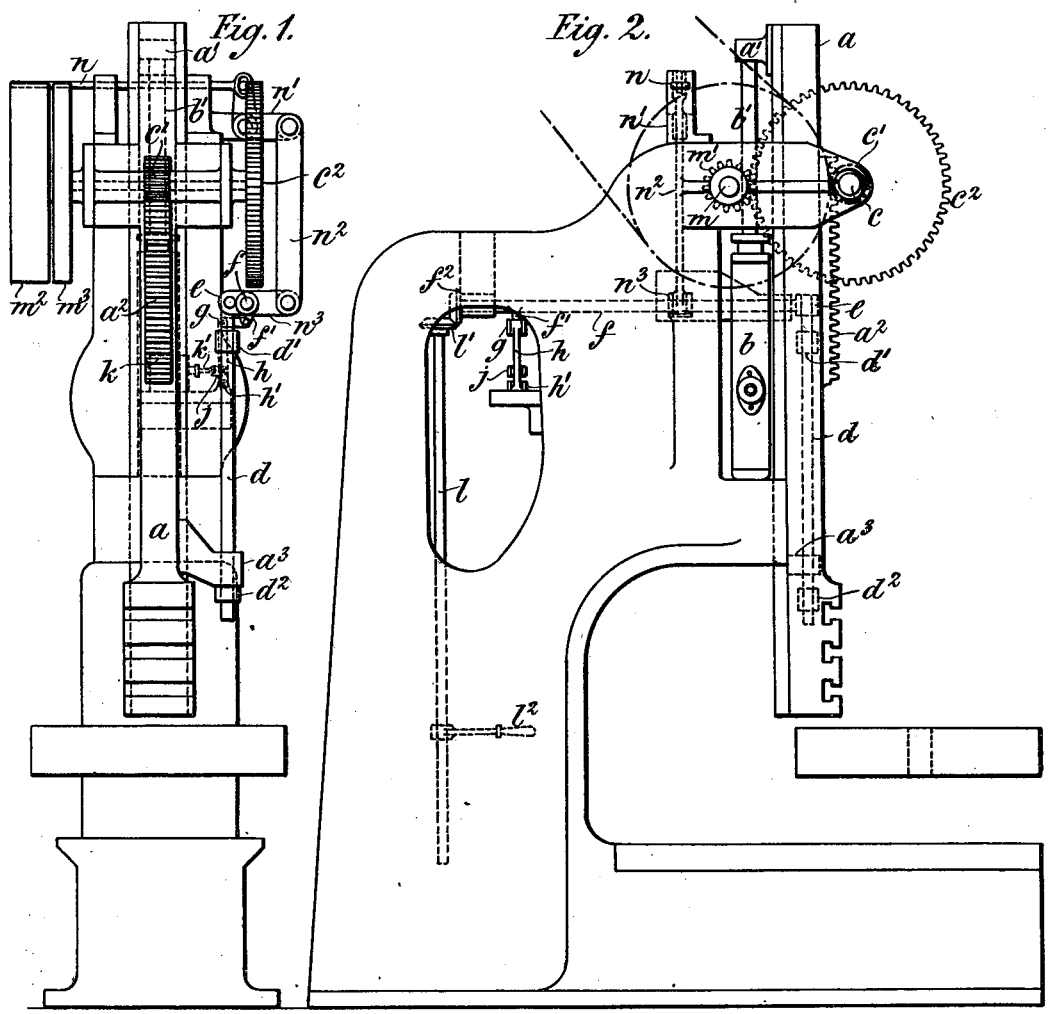
Fig. 1.  Fig. 2.
Fig. 3.
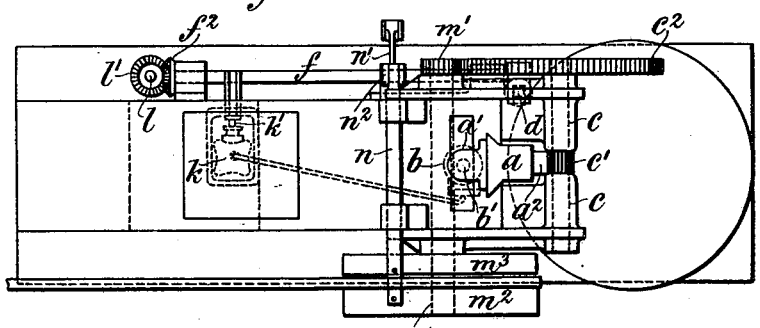
Witnesses.  Inventor.
Frederick William Tannett-Walker
By his Attorneys

UNITED STATES PATENT OFFICE.

FREDERICK WILLIAM TANNETT-WALKER, OF LEEDS, ENGLAND.

SLOTTING-MACHINE.

SPECIFICATION forming part of Letters Patent No. 675,255, dated May 28, 1901.

Application filed January 11, 1901. Serial No. 42,923. (No model.)

*To all whom it may concern:*

Be it known that I, FREDERICK WILLIAM TANNETT-WALKER, engineer, a subject of the Queen of Great Britain, residing at Hunslet, Leeds, in the county of York, England, have invented certain new and useful Improvements in Slotting-Machines, of which the following is a specification.

According to this invention the slotting-beam is moved in one direction by a hydraulic ram and in the other direction by ordinary gearing. Preferably the machine is vertical, the slotting-beam being raised by the ram and forced down by the gearing. The slotting-beam carries a lug, which works against a pair of tappets adjustably fixed to a vertical rod connected to an arm on a rocking shaft. This shaft works the belt-shifter, clutch, or other mechanism for putting the gearing into and out of action and also the valve for admitting water to and allowing it to escape from the hydraulic cylinder.

Figure 1 is a front elevation, Fig. 2 a side elevation, and Fig. 3 a plan, of a slotting-machine constructed according to this invention.

$a$ is the slotting-beam, working in guides in the frame.

$b$ is a hydraulic cylinder, whose ram $b'$ is fixed to a lug $a'$ on the slotting-beam.

$a^2$ is a rack fixed to the slotting-beam, and $c$ is a pinion on the shaft $c'$, gearing with it.

$a^3$ is a lug fixed to the slotting-beam, and $d$ is a rod passing through it. This rod has stops $d'$ $d^2$ adjustably fixed to it, against which the lug $a^3$ comes at the end of the up-and-down strokes of the slotting-beam. The rod $d$ is pivoted to one end of an arm $e$, fixed to the rocking shaft $f$. The shaft $f$ has fixed to it an arm $f'$, connected by a link $g$ to a lever $h$, pivoted at $h'$ and connected by a link $j$ to the rod $k'$ of the valve $k$, by which water is admitted to and allowed to escape from the cylinder $b$. The shaft $f$ has fixed to it a bevel-wheel $f^2$, gearing with the bevel-wheel $l'$, fixed to the shaft $l$, which is operated by the handle $l^2$, so that the machine can be controlled by hand. The shaft $c'$ has fixed to it the toothed wheel $c^2$, gearing with the pinion $m'$ on the shaft $m$, which has on it the fast and loose belt-pulleys $m^2$ $m^3$. The belt-shifter $n$ is pivoted to the bell-crank lever $n'$, which is connected by the link $n^2$ to the arm $n^3$, fixed to the rocking shaft $f$.

The slotting-beam $a$ is raised by admitting water into the cylinder $b$, the belt being on the loose pulley $m^2$ during the upstroke. When the beam $a$ reaches the top, the lug $a^3$ on it comes against the stop $d'$, thus rocking the shaft $f$. This movement of the shaft $f$ by the mechanism above described moves the valve $k$ of the hydraulic cylinder, allowing the water to escape from it and also shift the belt from the loose pulley $m^2$ to the front pulley $m^3$, so causing the beam to be forced down again by the gearing. Similarly when the beam reaches the bottom the lug $a^3$ comes against the stop $d^2$ and rocks the shaft $f$ back again, thus admitting water to the cylinder $b$ and shifting the belt from the fast pulley $m^3$ to the loose pulley $m^2$.

What I claim is—

1. The combination of a slotting-beam, a hydraulic cylinder and ram moving the beam in one direction gearing moving it in the other direction, a rocking shaft, an arm fixed to the shaft, stops carried by the arm, a lug on the beam engaging with the stops and means operated by the shaft for putting the ram and the gearing into and out of action.

2. The combination of a slotting-beam, a hydraulic cylinder, a ram working in the cylinder and fixed to the beam moving it in one direction, a rack on the beam and gearing engaging with the rack and moving the beam in the other direction.

3. The combination of a slotting-beam, a hydraulic cylinder, a ram working in the cylinder and fixed to the beam moving it in one direction, a rack on the beam, gearing engaging with the rack and moving the beam in the other direction, a rocking shaft, an arm fixed to the shaft, stops carried by the arm, a lug on the beam engaging with the stops and means operated by the shaft for putting the ram and the gearing into and out of action.

FREDERICK WILLIAM TANNETT-WALKER.

Witnesses:
W. J. MCELLROY,
BENJ. HOLGATE.